(12) United States Patent
Lindenblatt (10) Patent No.: US 6,450,324 B1
(45) Date of Patent: Sep. 17, 2002

(54) DOUBLE ACTING LOG SINGULATOR (75) Inventor: Bruno Lindenblatt, Prince George (CA)

(73) Assignee: Linden Fabricating & Engineering Ltd., Prince George (CA)

( * ) Notice: Subject to any disclaimer, the term of this patent is extended or adjusted under 35 U.S.C. 154(b) by 0 days.

(21) Appl. No.: 09/513,555

(22) Filed: Feb. 25, 2000

(51) Int. Cl.$^7$ .............................................. B65G 25/00
(52) U.S. Cl. ...................................................... 198/773
(58) Field of Search ........................................ 198/773

(56) References Cited

U.S. PATENT DOCUMENTS

| | | | | |
|---|---|---|---|---|
| 1,865,086 A | * | 6/1932 | Cutler ........................ | 198/773 |
| 3,168,190 A | * | 2/1965 | Nienstedt .................... | 198/773 |
| 5,257,688 A | | 11/1993 | Fridlund ..................... | 198/443 |
| 5,351,729 A | | 10/1994 | Brisson ....................... | 144/242 |
| 5,423,417 A | | 6/1995 | Redekop .................... | 198/774.2 |
| 5,678,681 A | * | 10/1997 | Klockars et al. ........... | 198/773 |

FOREIGN PATENT DOCUMENTS

| | | | | |
|---|---|---|---|---|
| CA | 1277682 | 1/1987 | ........... | B65G/25/04 |
| CA | 2067104 | 11/1991 | ........... | B27B/31/02 |
| CA | 2153917 | 7/1995 | ........... | B65G/25/00 |

* cited by examiner

*Primary Examiner*—D. Glenn Dayoan
*Assistant Examiner*—Lori L. Coletta
(74) *Attorney, Agent, or Firm*—Michael A. Glenn (57) ABSTRACT

Log singulating apparatus comprises two sets of interleaved support surfaces which reciprocate in the feed direction. Successive support surfaces are vertically overlapped and laterally offset and the two sets of support surfaces reciprocate out of phase by 180 degrees in relation to one another. Logs are promoted in the feed direction by abutment surfaces associated with each support surface. At the extremes of stroke of the sets of support surfaces, the abutment surfaces of overlapping support surfaces substantially align themselves to allow transfer of the log from one abutment surface to the next. This arrangement applies to each pair of overlapping support surfaces to ensure rapid promotion of the log toward the outfeed.

6 Claims, 7 Drawing Sheets

DOUBLE ACTING LOG SINGULATOR

FIELD OF THE INVENTION

This invention relates to power driven conveyors having a plurality of driven sections. In particular this invention relates to devices for unscrambling and singulating logs.

BACKGROUND OF THE INVENTION

U.S. Pat. No. 5,257,688 to Fridlund discloses a log singulator comprising a laterally spaced series of stationary steps which are interposed between a laterally spaced series of moving steps. The moving surfaces reciprocate to urge logs from an infeed location where the logs are received in a scrambled state toward the outfeed end where the logs are delivered one at a time. Singulation is achieved by selecting the height of the steps to minimize the number of logs promoted to the next step at each cycle.

U.S. Pat. No. 5,423,417 to Redekop discloses a log singulator having laterally spaced lift arms that rotate between a plurality of laterally spaced stationary steps to promote logs from one step to the next.

U.S. Pat. No. 5,351,729 to Brisson also discloses a singulator comprising a set of laterally spaced stepped stationary plates and laterally spaced moving steps.

The foregoing arrangement of laterally spaced sections is typical of many prior art log singulators. However, because the use of laterally spaced multiple sections involves several gaps between the sections, debris tends to fall between the gaps. Such debris has the potential to interfere with the drive mechanisms for the singulator. It also represents potential wood fibre which is either wasted or requires effort to recover. In any event, such debris accumulates and requires periodic cleaning.

It is an object of this invention to provide a log singulator which minimizes the amount of debris falling through gaps in the device.

It is a further object of this invention to provide a log singulator which rapidly and effectively singulates logs.

Other objects and advantages of the invention will be appreciated by reference to the following disclosure.

SUMMARY OF THE INVENTION

The invention comprises a singulator having a series of vertically overlapping and laterally offset support surfaces which reciprocate between one another through the same vertical plane. The support surfaces are continuous across the lateral extent of the singulator. The combined surfaces have the appearance of a single broad staircase with reciprocating steps.

Alternate support surfaces are connected together so as to create two sets of support surfaces which move in unison. The two sets of support surfaces are made to reciprocate out of phase with one another by 180° such that when one set of surfaces is at the end of its forward stroke, the other set of surfaces is at the end of its backward stroke.

An abutment surface is provided on each support surface to promote logs toward the next support surface during forward movement of the support surface. The abutment surface preferably extends from the forward edge of the support surface with which it is associated to terminate in close proximity to the support surface next below it so as to minimize the amount of debris that can be introduced between the support surfaces or between the abutment surface and the support surface below it.

The abutment surfaces of vertically adjacent support surfaces are substantially aligned when the support surfaces are at the ends of their respective strokes.

In another of its aspects, the invention comprises unscrambling and singulating apparatus for conveying logs from a first location in which a plurality of unsingulated logs are received to a second location to which singulated logs are delivered one at a time, comprising a plurality of parallel first planar support surfaces which are successively laterally offset in relation to one another and the planes of which are successively spaced in relation to one another, and the first planar surfaces being operatively connected to one another for simultaneous movement, a plurality of parallel second planar support surfaces which are successively laterally offset in relation to one another and the planes of which are successively spaced in relation to one another, the it second planar support surfaces being operatively connected for simultaneous movement, a drive mechanism for reciprocating said first and second planar surfaces in their respective planes, such that the movement of the first planar surfaces is out of phase with the movement of the second planar surfaces by 180°, the first planar surfaces being interleaved with said second planar surfaces such that successive first and second planar surfaces vertically overlap one another and each planar surface reciprocates between the planes of the two vertically adjacent planar surfaces, and an abutment surface associated with each of the first and second planar surfaces for urging a log in the direction of movement of the planar surface.

In another of its aspects, the invention comprises such apparatus wherein the reciprocating movement of said first and second planar surfaces is such that when any one of said planar surfaces reaches the end of its forward stroke and the immediately adjacent planar surface below it is at the end of its backward stroke, the abutment surfaces associated with both support surfaces are substantially aligned with one another.

In yet another of its aspects, the invention comprises such apparatus wherein the first and second planar surfaces are mounted on at least two vertical plates and the drive means comprises means for actuating movement of said plates.

Other aspects of the invention will become apparent from the detailed description of the preferred embodiment which follows and from the claims.

BRIEF DESCRIPTION OF THE DRAWINGS

The preferred embodiment of the invention will be described by reference to the drawings in which:

FIG. 1 is a perspective view of the preferred embodiment of the invention in which the infeed is at the right and the outfeed is at the left of the figure;

FIG. 2 is a side elevation of the preferred embodiment of the invention, in which the infeed is at the left and the outfeed is at the right of the figure; and, FIGS. 3a, 3b, 3c, 3d and 3e are side elevations of the invention showing the support surfaces at successive stroke positions;

DETAILED DESCRIPTION OF THE PREFERRED EMBODIMENT

Figure 1:
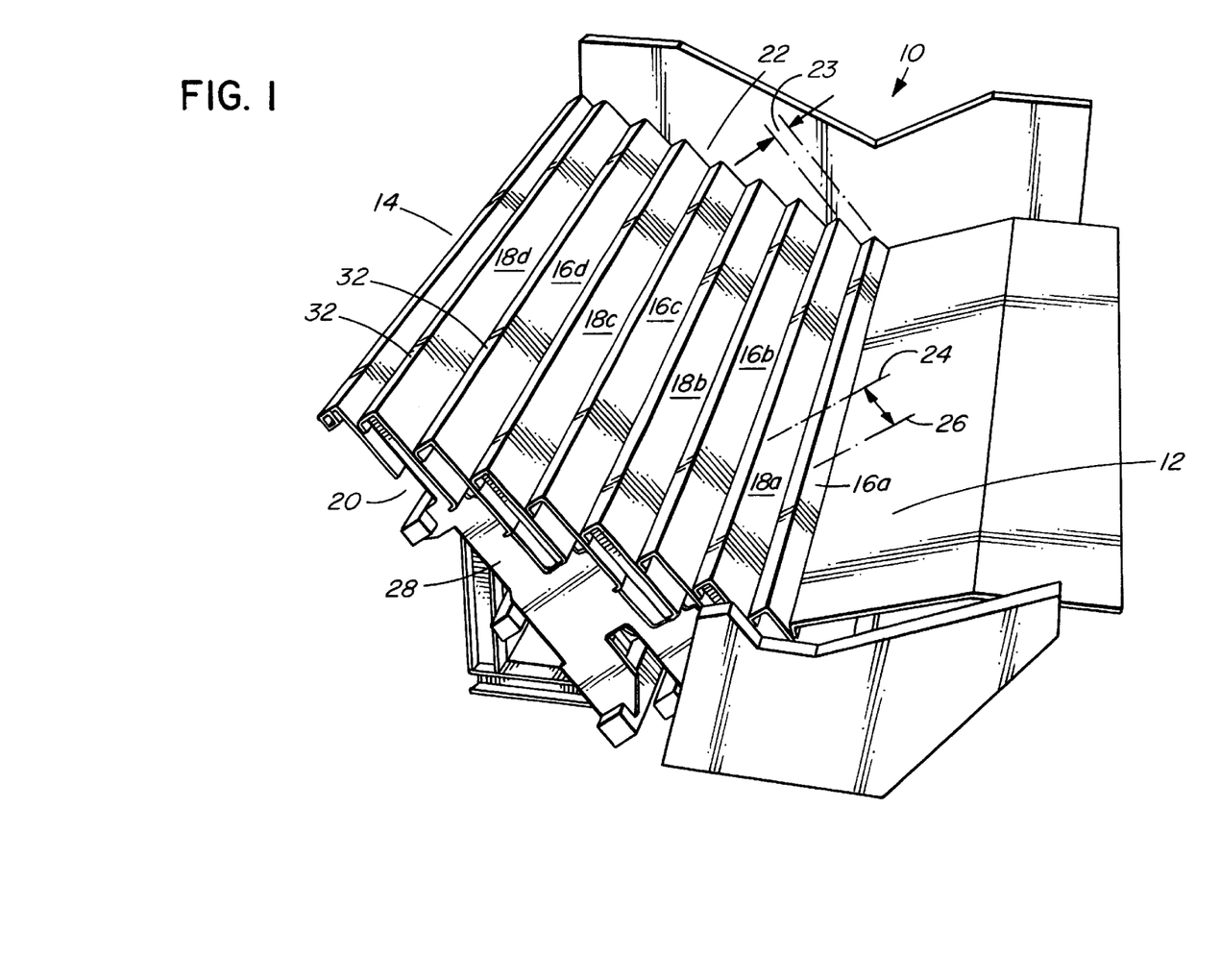
Figure 2:
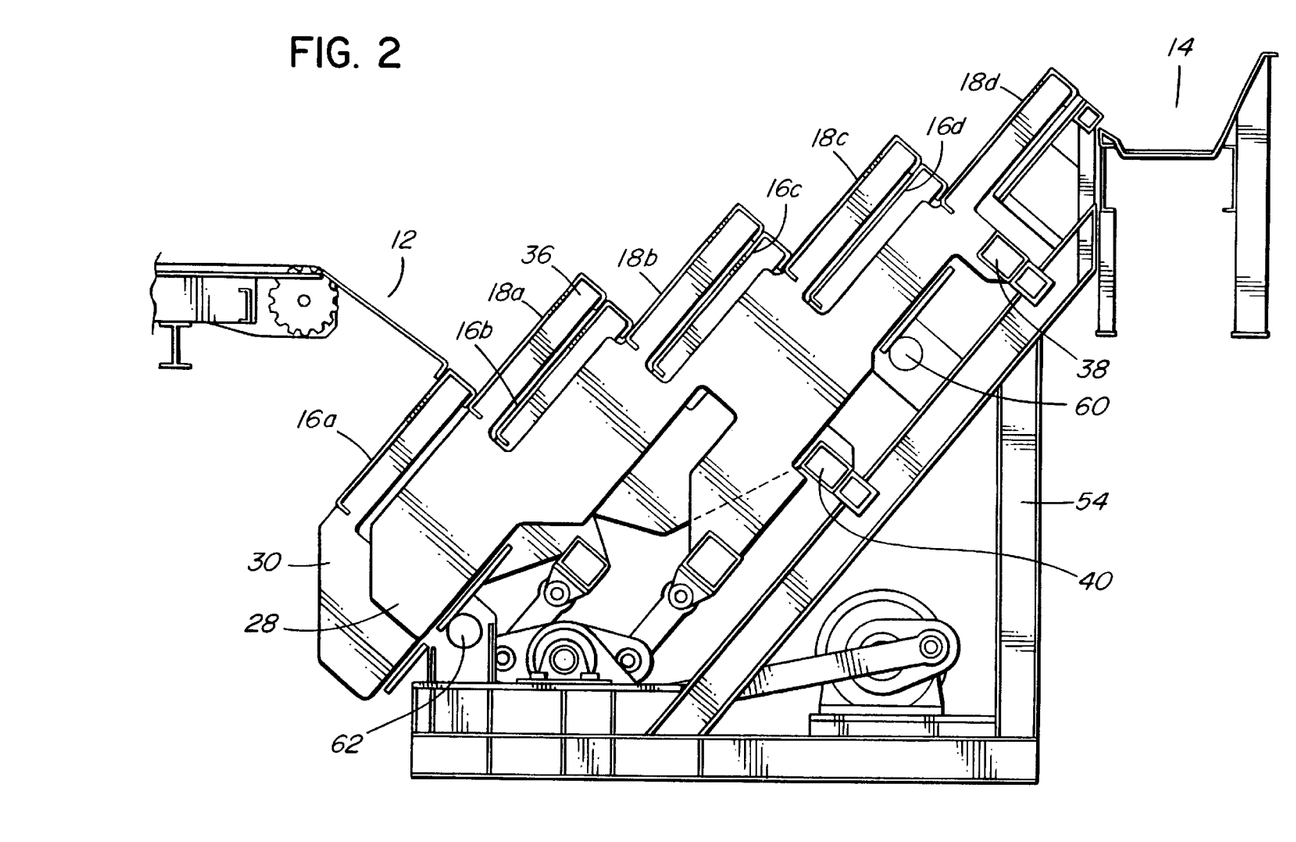

Referring to FIG. 1, the singulator 10 according to the invention delivers logs from an infeed location 12 where the logs are received in a scrambled and unsingulated bundle, to the outfeed 14 to which the device delivers unscrambled and singulated logs.

A series of planar support surfaces 16a, 16b, 16c, 16d, and 18a, 18b, 18c, 18d are parallel to one another and are each continuous across the lateral extent of the device (i.e., from side 20 to side 22). In the preferred embodiment, the planar support surfaces are formed plates. The formed plates may extend across the entire lateral extent of the device. Alternatively, each support surface may comprise a plurality of formed plates that are arranged side by side to span the lateral extent of the device, with each end of each plate being welded to the end of the adjacent plate and to underlying support plates (the support plates being described below) so as to effectively provide the equivalent of a continuous surface across the lateral extent of the device.

The planes of the support surfaces are successively offset in the vertical plane as between surfaces 16a and 18a and as indicated by the numeral 23. The support surfaces are also successively offset in the horizontal direction between the infeed and the outfeed as indicated by lines 24 and 26.

The offsets between successive support surfaces result in a step-like configuration extending from the infeed to the outfeed. The particular angles to the vertical that are formed by the planes of the support plates are not critical, provided the overall stair-like configuration extends from the infeed to the outfeed, and provided the support surfaces are parallel.

Figure 3A:
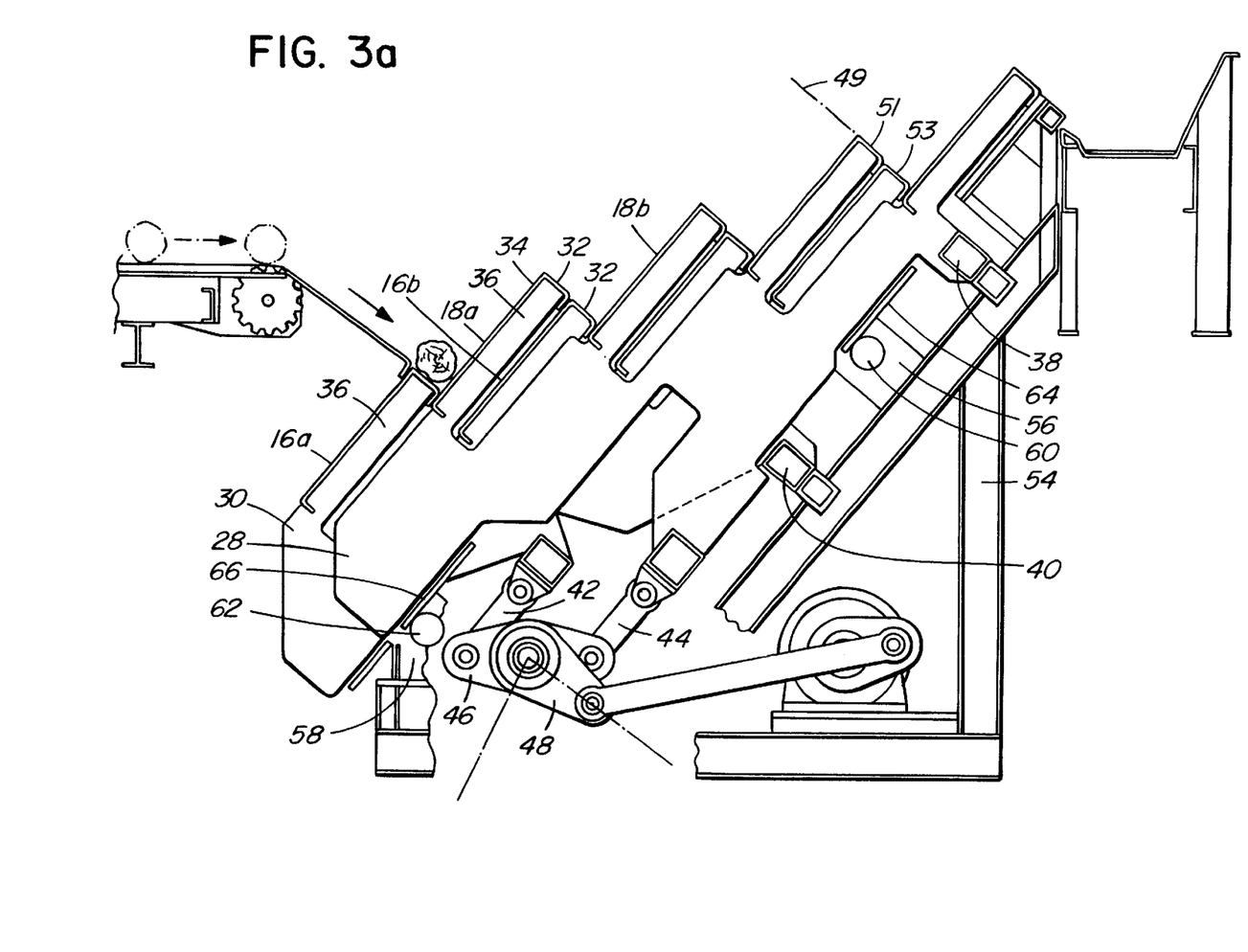
Figure 3B:
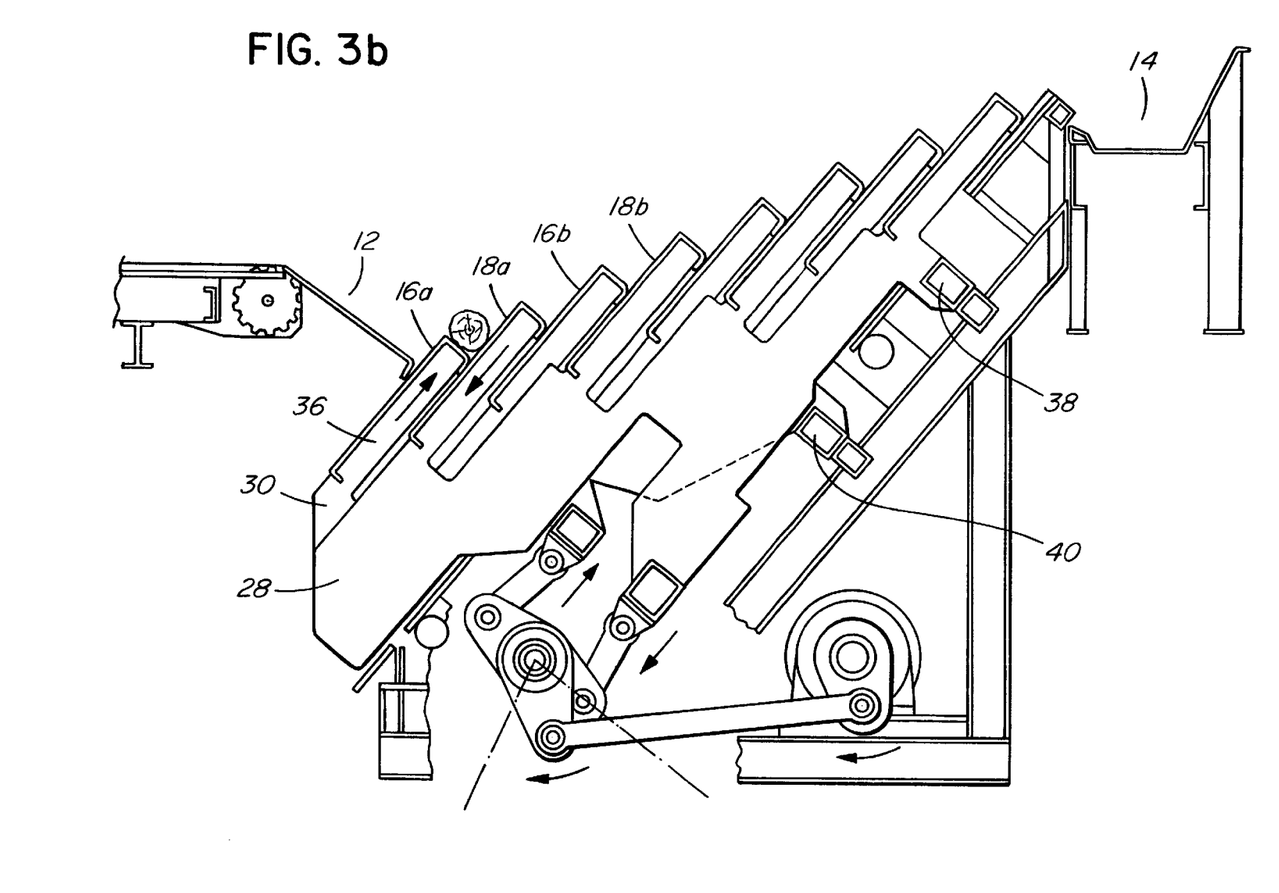
Figure 3C:
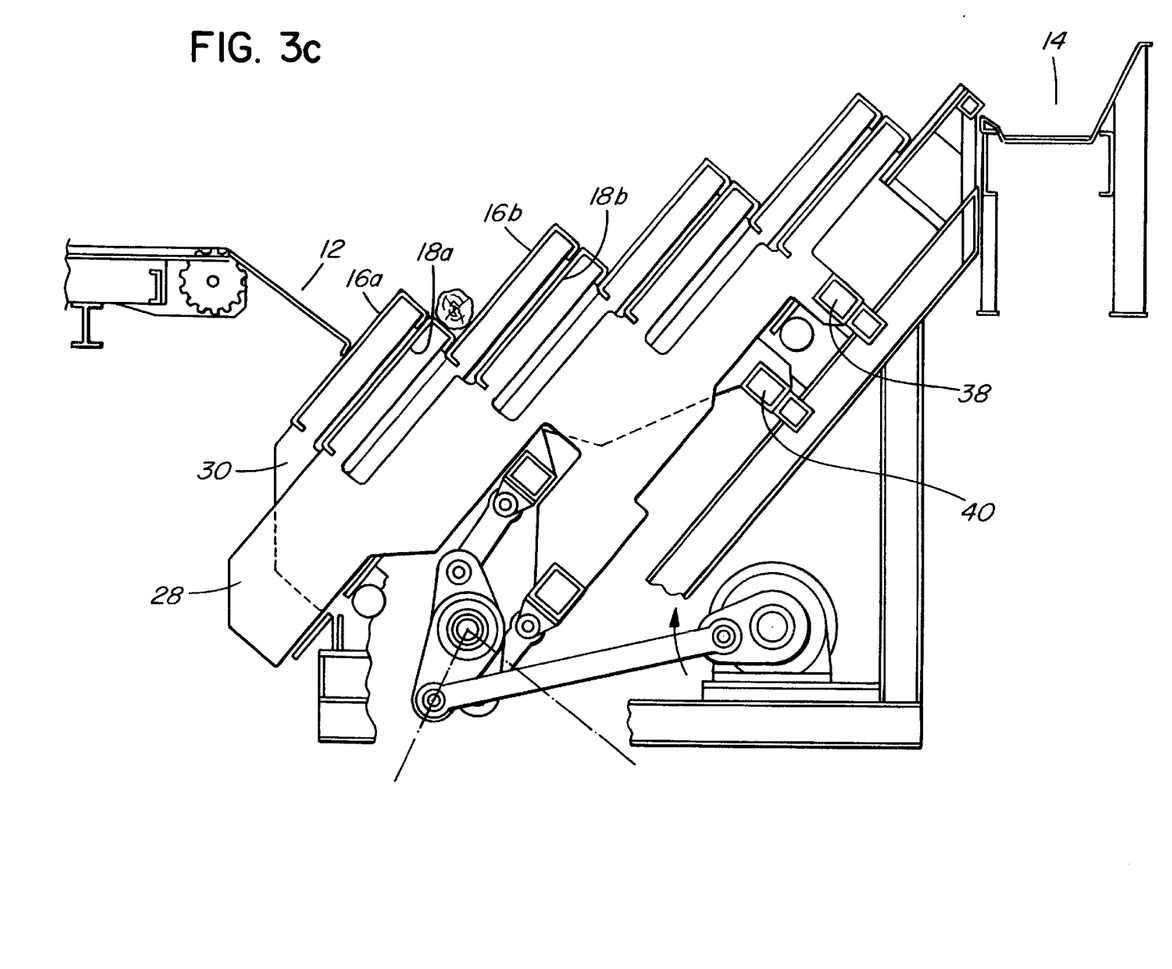
Figure 3D:
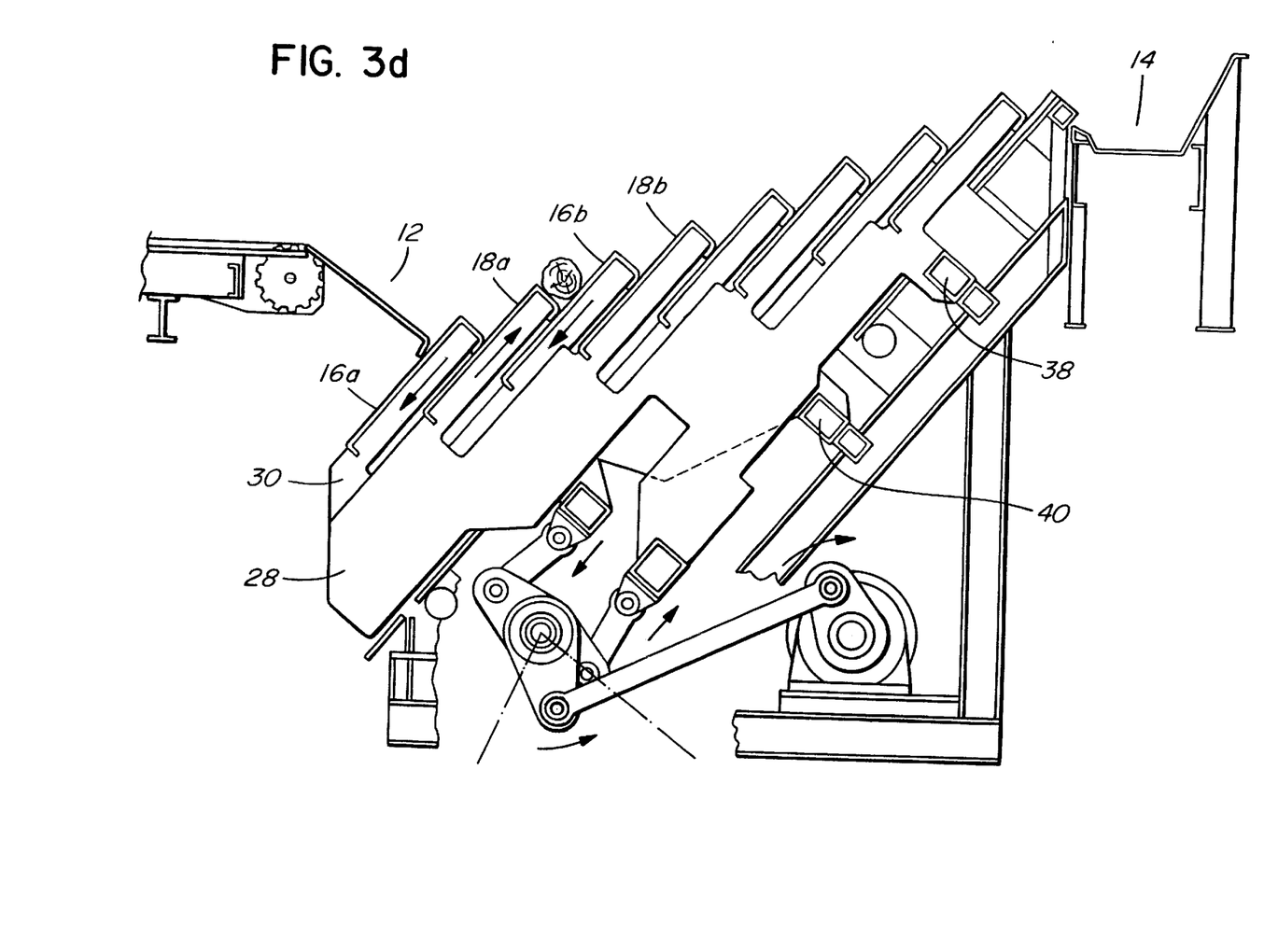
Figure 3E:
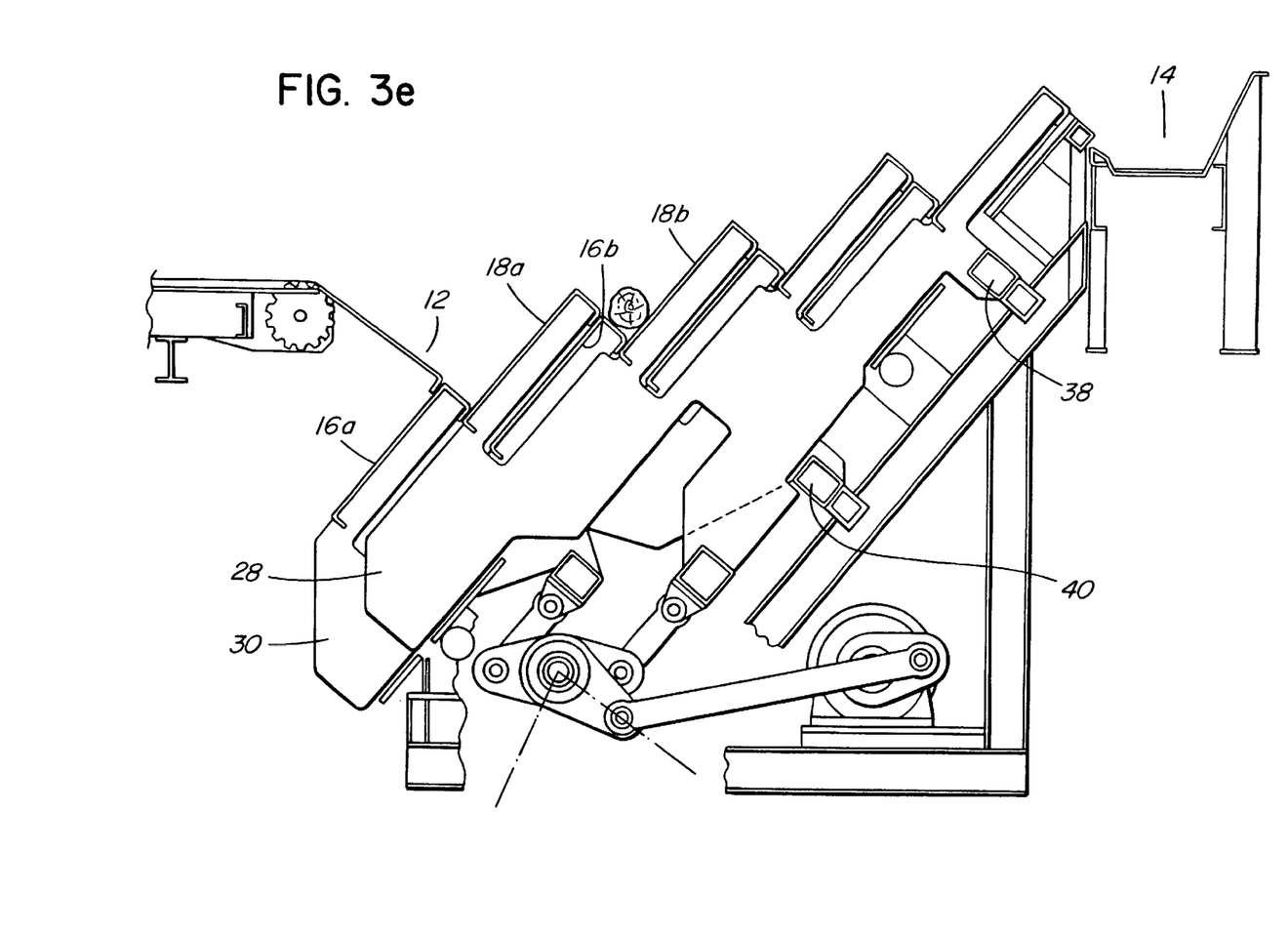

The planar support surfaces are arranged in two sets, the surfaces of one such set being identified by the numerals 16a to 16d and the surfaces of the other set by the numerals 18a to 18d. Surfaces 16a to 16d are interconnected by vertically oriented support plates 28 which are best seen in FIG. 3a. One of the support plates 28 is also visible in FIG. 1. Surfaces 18a to 18d are interconnected by vertically oriented support plates 30. Support plates 28 are parallel and spaced from support plates 30 to enable unobstructed movement of the plates along their parallel planes.

As is best appreciated by reference to FIG. 3a, abutment surfaces 32 are provided at the forward end of each support surface. Each abutment surface 32 extends generally toward the support surface which is next below it. In the preferred embodiment the abutment surface forms an angle of 90° in relation to its associated support surface, but the particular angle is not critical and need not be 90° provided the abutment surface extends generally in the direction of the support surface below it.

Each abutment surface 32 extends substantially up to and in close proximity to the support surface which is immediately below it. This serves to substantially close any gap between the adjacent surfaces and to minimize the amount of debris that can be passed between the two adjacent support surfaces or between the abutment surface and the support surface below it.

In the preferred embodiment, each support surface and its associated abutment surface is integrally formed as single angled cap plate 34 which is mounted on fingers 36 extending from the upper edges of the vertical plates 28 or 30 as the case may be.

Support plates 28 are connected to one another by cross members 38 while support plates 30 are connected to one another by cross members 40. Movement of the plates 28 and 30 is actuated by linkage arms 42, 44 which are attached either to the cross members 38 or 40 or to plates 28 or 30 as the case may be.

Each set of support plates is made to reciprocate in a rectilinear fashion. The reciprocating movement of the support surfaces 16 is out of phase by 180° with the reciprocating movement of the support surfaces 18. Thus, when support surfaces 16 are at the end of their forward stroke, support surfaces 18 are at the end of their backward stroke and vice versa. As this applies equally to all support surfaces, logs can be continuously and rapidly promoted toward the outfeed by being handed off from one support surface to the next as they reciprocate. As a log is pushed forward by an abutment surface and reaches the end of its forward stroke, the abutment surface of the next support surface will be aligned (since it will be at the end of its own backward stroke) and the log will fall to that support surface, to be immediately urged forward on the return (forward) stroke of the second support surface. This process is repeated until the log is discharged at the outfeed. FIGS. 3a to 3e illustrate successive positions of the two sets of plates and the promotion of a log in the feed direction.

A proper phase angle of 180° between the reciprocating movements of both sets of support surfaces is achieved by attaching link arms 42, 44 to opposite ends of a pivot plate assembly 46 which is in turn actuated by a drive plate assembly and crank arm 48.

The length of the support surfaces, their position on the vertical plates 28 or 30 and the length of the stroke they undergo should be chosen so that when one support surface is at the end of its forward stroke and the support surface below it is at the end of its backward stroke, the abutment surfaces associated with both support surfaces are in close proximity or substantially aligned, as indicated by the numeral 49 in FIG. 3a. This provide a nearly continuous surface for a log to fall from one support surface to the next, for example from support surface 51 to support surface 53. Such alignment need not be perfect. In the preferred embodiment, the upper-most abutment surface extends between half an inch and an inch beyond the lower abutment surface to ensure that logs easily fall to the support surface below. Similarly, the abutment surfaces need not necessarily be

I claim:

1. Unscrambling and singulating apparatus for conveying logs from a first location in which a plurality of unsingulated logs are received to a second location to which singulated logs are delivered one at a time, comprising:

at least three parallel first planar support surfaces which are successively laterally offset in relation to one another, said first planar support surfaces defining planes that are successively spaced in relation to one another, said first planar support surfaces being operatively connected to one another for simultaneous movement, said successive lateral offset and said simultaneous movement of said first planar support surfaces being maintained by rigid connection of said first planar support surfaces to a first rigid spacing member;

at least three parallel second planar support surfaces which are successively laterally offset in relation to one another, said second planar support surfaces defining planes that are successively spaced in relation to one another, said second planar support surfaces being operatively connected to one another for simultaneous movement, said successive lateral offset and said simultaneous movement of said second planar support surfaces being maintained by rigid connection of said second planar support surfaces to a second rigid spacing member;

a drive mechanism for causing reciprocating movement of said first and second planar support surfaces in the respective planes of said first and second planar support surfaces, such that movement of the first planar support surfaces is out of phase with movement of the second planar support surfaces by 180°;

said first planar surfaces being interleaved with said second planar surfaces such that successive first and second planar surfaces vertically overlap one another and each planar surface reciprocates between the uppermost planes of the two vertically adjacent planar surfaces; and, an abutment surface associated with each of said first and second planar surfaces for urging a log to move toward said second location.

2. Apparatus as in claim 1 wherein said planar surfaces are laterally continuous across the apparatus.

3. Apparatus as in claim 2 wherein said reciprocating movement of said first and second planar surfaces is such that when any one of said planar surfaces completes its movement in the direction of said second location, and the vertically adjacent planar surface below said one of said planar surfaces completes its movement in the direction of said first location, the abutment surfaces associated with both support surfaces are substantially aligned with one another.

4. Apparatus as in claim 3 wherein said abutment surface of each planar surface extends from a forward edge of said planar surface toward the planar surface immediately adjacent and below said planar surface.

5. Apparatus as in claim 4 wherein said abutment surface extends substantially up to and in close proximity to said immediately adjacent planar surface so as to substantially close any gap between said immediately adjacent planar surface and to minimize debris that can be passed between said surfaces.

6. Apparatus as in claim 1, 2, 3, 4 or 5 wherein said first and second rigid spacing members comprise laterally spaced vertical plates and said drive means comprises means for actuating movement of said plates.

\* \* \* \* \*

UNITED STATES PATENT AND TRADEMARK OFFICE
CERTIFICATE OF CORRECTION

PATENT NO. : 6,450,324 B1
DATED : September 17, 2002
INVENTOR(S) : Bruno Lindenblatt It is certified that error appears in the above-identified patent and that said Letters Patent is hereby corrected as shown below:

<u>Column 2,</u>
Line 16, delete "it".

<u>Column 4,</u>
Line 35, after "be" insert -- parallel. However, they are preferably at least approximately parallel and a properly parallel arrangement is preferred.

The device is mounted on a frame 54 which includes wheel mounts 56 and 58. Stroke wheels 60 and 62 are mounted in the wheel mounts and runner bars 64 and 66 are secured to the support plates 28 and 30 to provide a surface on which to guide and support their reciprocating movement.

It will be appreciated by those skilled in the art that certain deviations from the preferred embodiment described herein may be practised and certain alterations may be made without departing from the scope of the invention. --.

Signed and Sealed this

Seventh Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,450,324 B1                                                Page 1 of 1
DATED          : September 17, 2002
INVENTOR(S)    : Bruno Lindenblatt It is certified that error appears in the above-identified patent and that said Letters Patent is hereby corrected as shown below:

<u>Title page,</u>
Item [73], Assignee, should read -- Linden Fabricating and Engineering (Prince George) Ltd., Prince George (CA) --

Signed and Sealed this

Eleventh Day of November, 2003

JAMES E. ROGAN
*Director of the United States Patent and Trademark Office*